(12) United States Patent
Cooke et al.

(10) Patent No.: US 8,678,668 B2
(45) Date of Patent: Mar. 25, 2014

(54) OVERMOLDED FERRULE BOOT AND METHODS FOR MAKING THE SAME

(75) Inventors: Terry L. Cooke, Hickory, NC (US);
Tory A. Klavuhn, Newton, NC (US);
Matthew W. Smith, Lenoir, NC (US)

(73) Assignee: Corning Cable Systems LLC, Hickory, NC (US)

( * ) Notice: Subject to any disclaimer, the term of this patent is extended or adjusted under 35 U.S.C. 154(b) by 166 days.

(21) Appl. No.: 13/361,332

(22) Filed: Jan. 30, 2012

(65) Prior Publication Data

US 2013/0195406 A1 Aug. 1, 2013

(51) Int. Cl.
*G02B 6/38* (2006.01)
*G02B 6/44* (2006.01)

(52) U.S. Cl.
USPC .............. 385/72; 385/70; 385/71; 385/114

(58) Field of Classification Search
USPC .............................. 385/71, 114, 72
See application file for complete search history.

(56) References Cited

U.S. PATENT DOCUMENTS

| | | | | |
|---|---|---|---|---|
| 4,818,059 A * | 4/1989 | Kakii et al. | ...... | 385/65 |
| 5,568,581 A * | 10/1996 | Johnson et al. | ...... | 385/78 |
| 5,780,079 A * | 7/1998 | Lee | ...... | 425/577 |
| 5,926,596 A * | 7/1999 | Edwards et al. | ...... | 385/78 |
| 6,129,865 A * | 10/2000 | Jeong et al. | ...... | 264/1.25 |
| 6,342,170 B1 * | 1/2002 | Yang | ...... | 264/1.25 |
| 6,435,731 B1 * | 8/2002 | Yamaguchi et al. | ...... | 385/78 |
| 6,536,956 B2 | 3/2003 | Luther et al. | ...... | 385/86 |
| 6,702,479 B2 | 3/2004 | Yang | ...... | 385/78 |
| 6,769,811 B2 * | 8/2004 | Hall et al. | ...... | 385/59 |
| 7,264,402 B2 | 9/2007 | Theuerkorn et al. | ...... | 385/59 |
| 7,354,202 B1 * | 4/2008 | Luger | ...... | 385/80 |
| 7,412,130 B2 * | 8/2008 | Harness et al. | ...... | 385/31 |
| 7,785,019 B2 | 8/2010 | Lewallen et al. | ...... | 385/75 |
| 2002/0009513 A1 * | 1/2002 | Dean et al. | ...... | 425/190 |
| 2002/0110333 A1 | 8/2002 | Yang | ...... | 385/78 |
| 2003/0016918 A1 * | 1/2003 | Grabbe | ...... | 385/78 |
| 2003/0021548 A1 | 1/2003 | Luther et al. | ...... | 385/86 |
| 2003/0190130 A1 * | 10/2003 | Welker et al. | ...... | 385/126 |
| 2004/0042731 A1 * | 3/2004 | Hall | ...... | 385/59 |
| 2004/0109646 A1 * | 6/2004 | Anderson et al. | ...... | 385/71 |
| 2004/0170361 A1 * | 9/2004 | Grabbe | ...... | 385/78 |
| 2006/0115218 A1 | 6/2006 | Howard et al. | ...... | 385/59 |
| 2006/0204178 A1 | 9/2006 | Theuerkorn et al. | ...... | 385/59 |
| 2007/0160327 A1 | 7/2007 | Lewallen et al. | ...... | 385/53 |
| 2010/0067852 A1 * | 3/2010 | Dangel et al. | ...... | 385/83 |
| 2010/0301502 A1 * | 12/2010 | Ott et al. | ...... | 264/1.25 |
| 2010/0310213 A1 | 12/2010 | Lewallen et al. | ...... | 385/75 |
| 2012/0301090 A1 * | 11/2012 | Cline et al. | ...... | 385/103 |
| 2013/0028560 A1 * | 1/2013 | Arnold et al. | ...... | 385/80 |
| 2013/0108220 A1 * | 5/2013 | Gonzalez Garcia et al. | ... | 385/78 |
| 2013/0136401 A1 * | 5/2013 | Cooke et al. | ...... | 385/80 |
| 2013/0195406 A1 * | 8/2013 | Cooke et al. | ...... | 385/72 |

* cited by examiner

*Primary Examiner* — Rhonda Peace

(57) ABSTRACT

Overmolded ferrule assemblies and methods for making the same are disclosed. Some embodiments include positioning a first plurality of fibers in an alignment fixture in a predetermined arrangement such that a predetermined length of the first plurality of fibers extends beyond an end of the alignment fixture. Similarly, some embodiments include positioning a cover portion of the alignment fixture onto the first plurality of fibers, such that corresponding cover recesses on the cover portion align with the corresponding base recesses on the base portion. One method includes the steps of injecting a flowable material into a port on the alignment fixture, waiting a predetermined time for the flowable material to cure, and after the predetermined time, separating the base portion and the cover portion from the first plurality of fibers and the flowable material to create the overmolded ferrule boot.

17 Claims, 6 Drawing Sheets

312  306a, 306b 302a, 302b

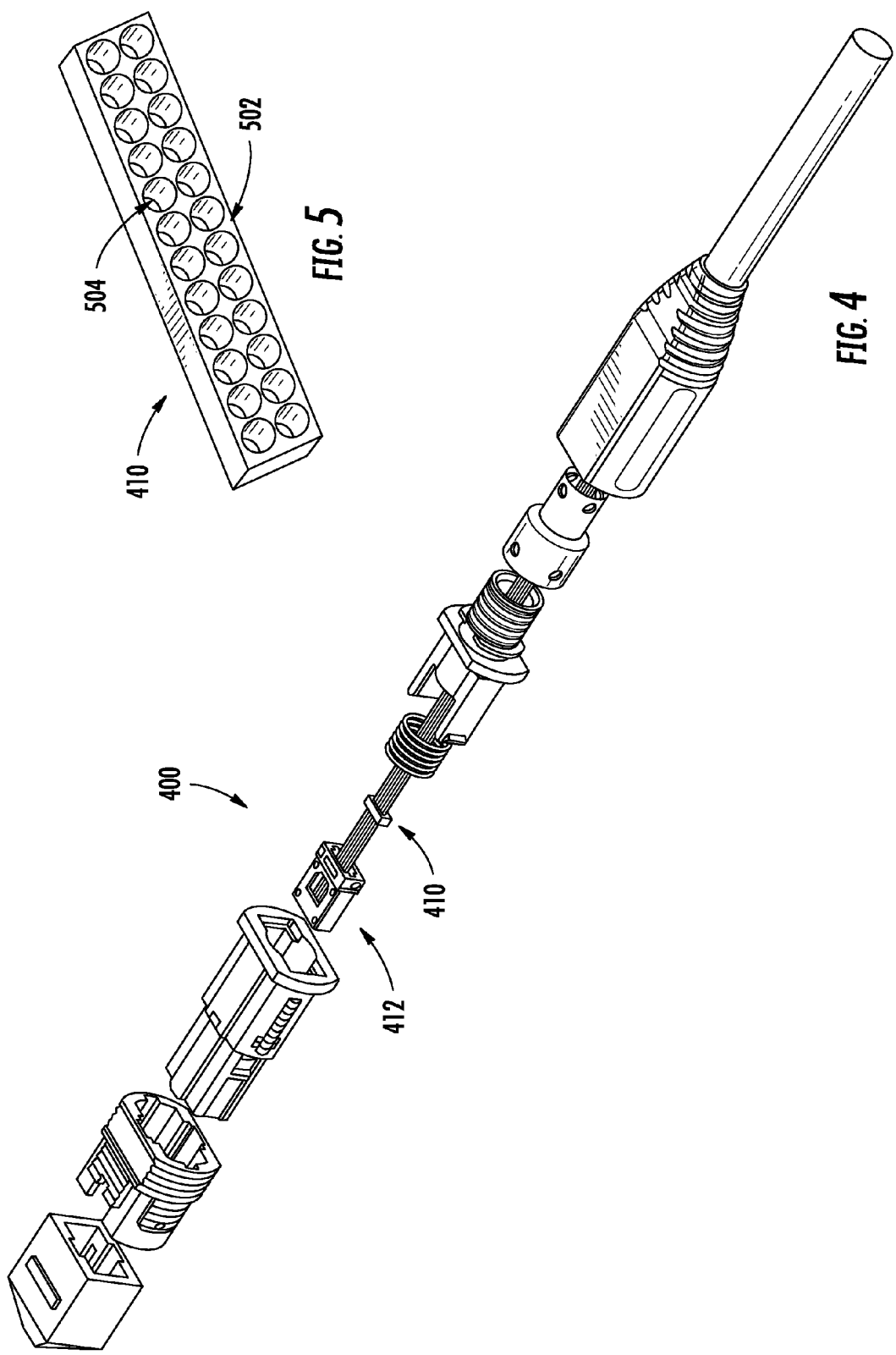

OVERMOLDED FERRULE BOOT AND METHODS FOR MAKING THE SAME

BACKGROUND

1. Field

The present disclosure generally methods and structures for aligning and arranging optical fibers. Specifically, the present disclosure relates to overmolded ferrule boot assemblies and methods for making the same and, more specifically, to embodiments of a ferrule boot that is molded directly onto fibers.

2. Technical Background

Optical fiber communication systems typically include optical fiber connectors. For instance, one or more optical fiber connectors can be used to join adjacent segments of optical fiber together for creating optical connections that can be connected, disconnected, and/or reconfigured as desired. For instance, one or more optical fiber connectors can be used for joining an optical fiber segment to an optical device or joining two optical fiber segments. Typical optical fiber connectors include a conventional ferrule designed to hold and precisely align one or more optical fibers in an appropriate orientation for optically joining the end of the optical fiber segment to an optical interface of an optical device or another optical fiber segment.

In order to provide the desired alignment, the ferrules define a pair of elongate alignment holes that receive and cooperate with respective alignment members, such as guide pins, to accurately align opposing ferrules, and in turn, the optical fibers mounted within the multifiber ferrules. In other words, the ferrule has alignment structure for precisely mating the optical fibers secured within the ferrule with a complimentary device for the transmission of optical signals. As an example, a multifiber connector such as a mechanical transfer (MT) connector may be configured with a plurality of optical fiber inputs (i.e., bores) that are aligned in a linear fashion with a precise and tightly-spaced geometry.

For alignment with the bores of the ferrule, loose optical fibers have also been arranged into fiber arrays for ease of installation into the optical fiber connectors. One known process of arranging optical fibers into optical fiber arrays is commonly referred to as ribbonization. One common approach for the ribbonization of optical fibers includes the use of tape that is applied along a suitable short length at the ends of the loose optical fibers for maintaining the optical fibers in a desired sequence. In other words, the optical fibers are arranged in the desired sequence at the ends of the fibers and a short piece of tape is applied to the fibers to maintain their position and aid the insertion of the plurality of fibers into the ferrule. By way of example, the ribbonized length may be about one inch or longer as desired and trimming of the optical fibers and/or tape may be required to remove any excess length of the ribbonized portion. Such ribbonization of optical fibers can be labor intensive and time-consuming. Thus, there is an unresolved need to quickly and easily arrange optical fibers for insertion into a ferrule of an optical fiber assembly.

SUMMARY

Embodiments disclosed herein include systems and methods for an overmolded ferrule boot for connecting to a ferrule. Some embodiments include positioning a first plurality of fibers in corresponding base recesses of a base portion of an alignment fixture, the first plurality of fibers positioned in a predetermined arrangement, the first plurality of fibers positioned such that a predetermined length of the first plurality of fibers extends beyond an end of the base portion. Similarly, some embodiments include positioning a cover portion of the alignment fixture onto the first plurality of fibers, such that corresponding cover recesses on the cover portion align with the corresponding base recesses on the base portion. Still some embodiments include injecting a flowable material into a port on the alignment fixture, waiting a predetermined time for the flowable material to cure, and after the predetermined time, separate the base portion and the cover portion from the first plurality of fibers and the flowable material to create the overmolded ferrule boot.

Some embodiments of an overmolded ferrule boot assembly include a first plurality of fibers arranged in a first linear configuration and a ferrule assembly with a ferrule and an overmolded ferrule boot that is integral with the first plurality of fibers, where the overmolded ferrule boot includes a connector insertion portion and a handle portion. The connector insertion portion may define a connector width. The handle portion may define a handle width, where the handle width is greater than the connector width, such that the handle portion extends beyond the connector insertion portion to define a connector backstop.

Still some embodiments of a method include positioning a plurality of fibers in corresponding recesses of an alignment fixture, the plurality of fibers positioned in a predetermined arrangement, the plurality of fibers positioned such that a predetermined length of the plurality of fibers extends beyond an end of the alignment fixture and providing a heat shrink alignment portion to the alignment fixture. Similarly, some embodiments include waiting a first predetermined time for the alignment fixture to cure and after the first predetermined time, removing the heat shrink alignment portion from the plurality of fibers to create the overmolded ferrule boot.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

FIG. 4 depicts an exploded view of a fiber optic connector with a heat shrink alignment portion, according to embodiments disclosed herein;

FIG. 5 depicts an embodiment of a heat shrink alignment portion of FIG. 4, according to embodiments disclosed herein;

DETAILED DESCRIPTION

Embodiments described herein generally relate to overmolded ferrule boot assembiles that include a plurality of optical fibers positioned and aligned by an overmolded ferrule boot, for holding the optical fibers in place relative to each other during assembly of the optical fiber assembly. The ferrule boot organizes the optical fibers within the overmolded ferrule boot. Further, the assembly of the ferrule boot and optical fibers may be inserted or otherwise connected to a ferrule as desired.

Figure 1:
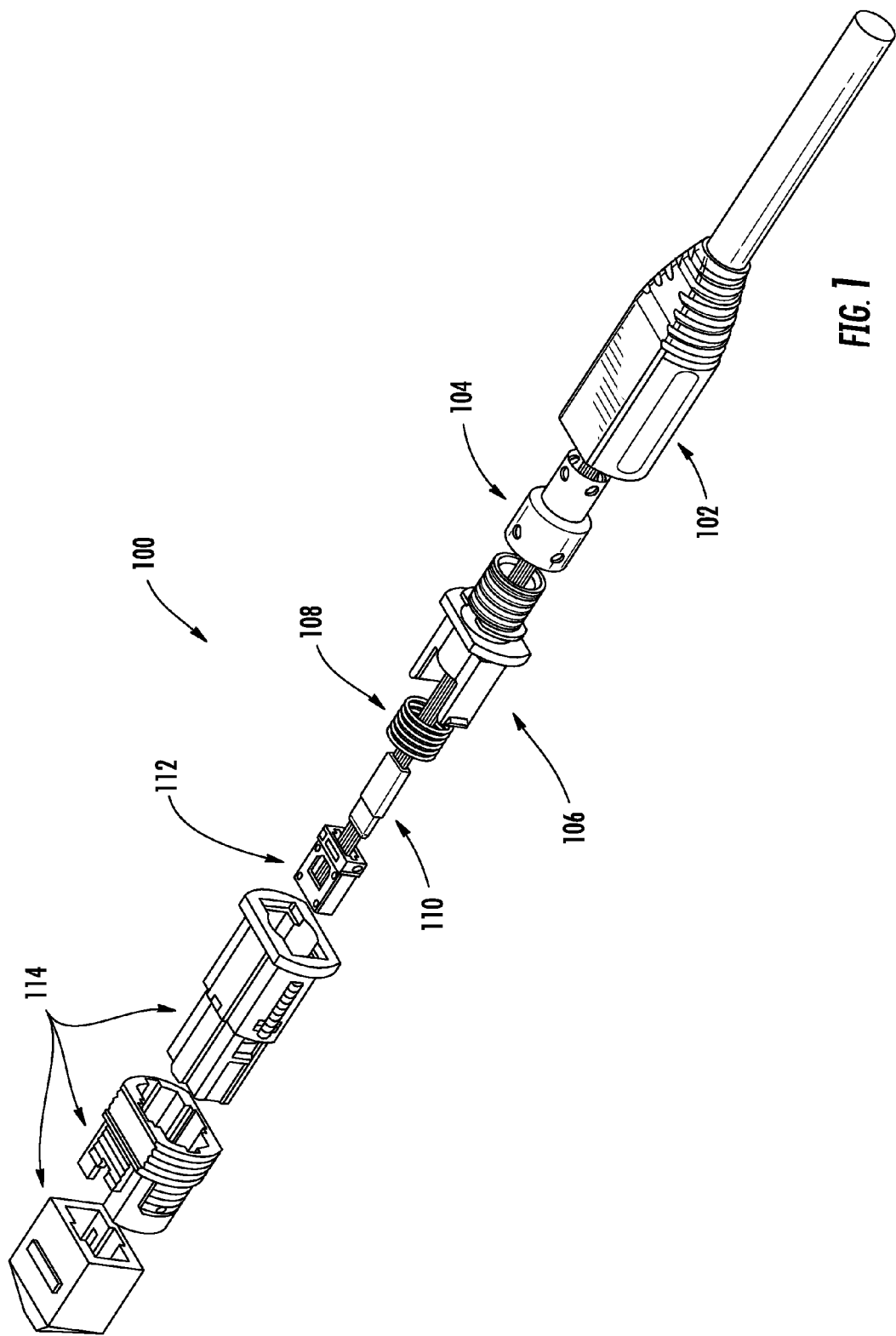
FIG. 1 depicts an exploded view of an explanatory fiber optic connector, according to embodiments disclosed herein.

Referring initially to the drawings, FIG. 1 depicts an exploded view of an explanatory fiber optic connector 100, according to embodiments disclosed herein. More specifically, a fiber optic connector 100 includes a connector boot 102, a crimp band 104, a spring push 106, a coil spring 108, a ferrule boot 110, a multifiber ferrule 112, and a housing portion 114. Specifically, the multifiber ferrule 112 may include a ferrule body that is generally rectangular in lateral cross-section. Although an MT-style ferrule is illustrated and described herein, the multifiber ferrule 112 need not be an MT-type ferrule and may be any other type of multifiber ferrule. Regardless of the type, the multifiber ferrule 112 having a mating end face and an opposed rear face extends lengthwise within the fiber optic connector 100 and receives and orders optical fibers therein. Specifically, the ferrule body defines a plurality of bores opening through the end face. The bores are arranged in one or more laterally extending linear rows for receiving the end portions of respective optical fibers therein.

Although the embodiments of the multifiber ferrule 112 may include total of twelve bores such that the multifiber ferrule 112 can be mounted upon the end portions of twelve individual optical fibers, the end face may define any number of bores, such as 2, 4, 6, 8, 10, 12, 24 or more. In addition, the multifiber ferrule 112 may include more than a single linear row of bores. For instance, the multifiber ferrule 112 can have two linear rows of bores with each row having 12 optical fibers. Further, the bores need not be arranged in one or more laterally extending linear rows. For example, any number of bores may be arranged in any predetermined pattern on the end face of the multifiber ferrule 112.

The ferrule body of the multifiber ferrule 112 may also define one or more elongate guide pin holes as known in the art. The guide pin holes open through the end face and are adapted to receive a respective guide pin to align the multifiber ferrule 112 with an opposing ferrule of a mating connector in a known manner. The guide pin holes defined by the ferrule body in turn define a longitudinal axis extending through the center of the guide pin hole. The multifiber ferrule 112 may be manufactured such that the longitudinal axis of each guide pin hole is precisely parallel to the bores extending lengthwise through the ferrule body and perpendicular to the end face.

As also illustrated, the overmolded ferrule boot 110 of the embodiment shown in FIG. 1 is positioned adjacent the rear face of the multifiber ferrule 112, and may be configured to have a portion inserted into multifiber ferrule 112. An opening extending lengthwise through the spring push 106 permits the end portions of the optical fibers (not shown) to pass through the spring push 106 to overmolded ferrule boot 110 and on to the multifiber ferrule 112.

As also illustrated, the coil spring 108 is positioned between the overmolded ferrule boot 110 and the spring push 106. In some embodiments, the coil spring 108 is a helical spring having dead coils with ground ends in certain embodiments and open coils in other embodiments. The compressive force of the coil spring 108 may vary depending on the type of fiber optic connector and multifiber ferrule, but preferably is in the range of about 9-11 Newtons. The spring push 106 comprises a forward portion for engaging the rearward most coil of the coil spring 108, and thereby retaining the coil spring 108 against the overmolded ferrule boot 110. An opening extending lengthwise through the spring push 106 permits the end portions of the optical fibers (not shown) to pass through the spring push 106 to the rear face of the multifiber ferrule 112. The fibers are positioned within the opening of the spring push 106, and the opening of the coil spring 108. With the overmolded ferrule boot 110, the fibers are then advantageously aligned for insertion into the multifiber ferrule 112. In other words, the overmolded ferrule boot 110 integrally formed on the optical fibers maintains the position and order of the fibers so that the fibers can quickly and easily be inserted into the bores of the ferrule. Thereafter, a housing portion 114 is coupled with the first housing portion to complete the optic connector.

Figure 2:
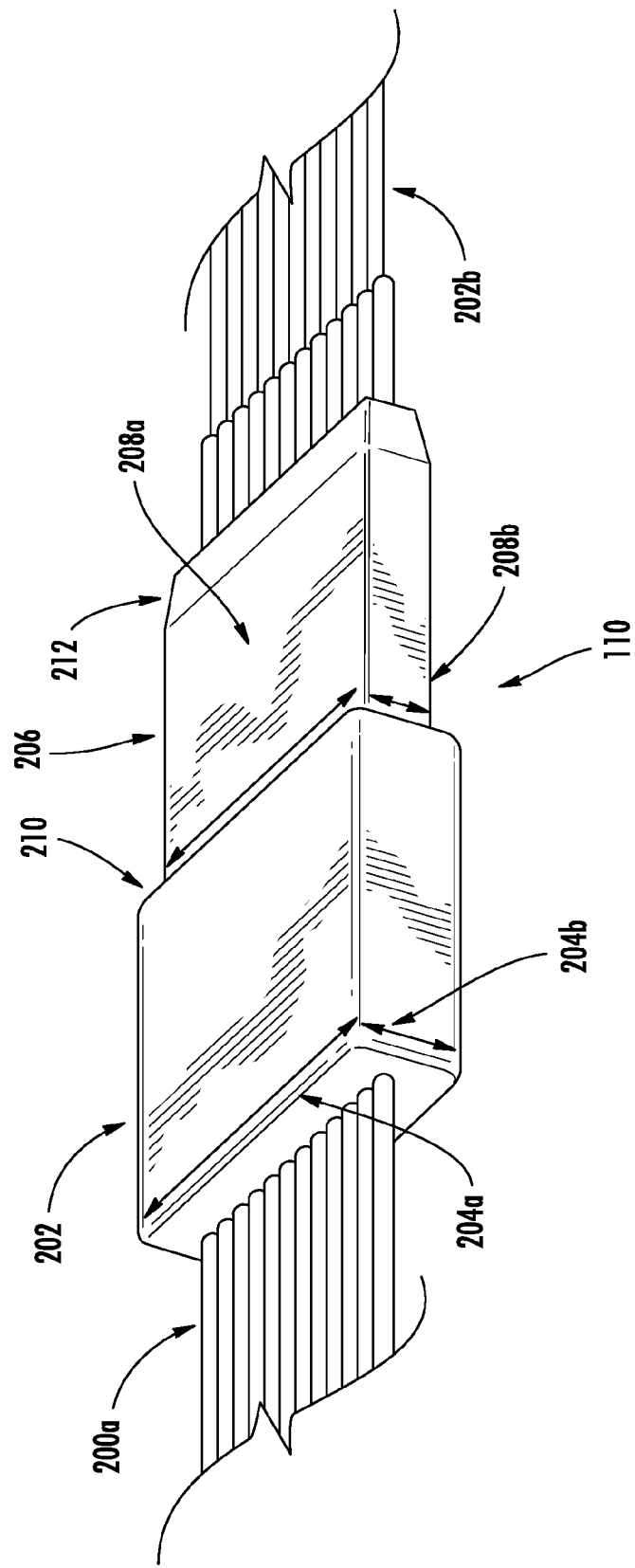
FIG. 2 depicts an explanatory embodiment of an overmolded ferrule boot, according to embodiments disclosed herein.

FIG. 2 depicts an explanatory embodiment of an overmolded ferrule boot 110, according to embodiments disclosed herein. As illustrated, the overmolded ferrule boot 110 may be configured as a ferrule boot that is integral with optical fibers 200a, 200b (which are part of the same continuous optical fiber (not numbered) that extends on both sides of overmolded ferrule boot 110). As described in more detail below, the overmolded ferrule boot 110 may be created by injecting a liquid compound, powder, or other material into a mold around the fibers, such that upon curing, the overmolded ferrule boot 110 orders, aligns, and positions the fibers for insertion into a multifiber ferrule, such as the multifiber ferrule 112, from FIG. 1. A ferrule assembly may be formed from a ferrule and an overmolded ferrule boot formed about the optical fibers.

The liquid compound may include any number of different materials. As an example, the liquid material may include, but is not limited to polymers, including thermoplastics, polyurethane, and/or polyamid materials such as those manufactured by Henkel Corporation under the Macromelt® brand. Depending on the embodiment, other similar materials may be utilized.

As also illustrated, the overmolded ferrule boot 110 is configured with a handle portion 202, which defines a handle width 204a, measured across the optical fibers 200a, 200b and a handle height 204b, measured perpendicular to the handle width 204a. Also included is a connector insertion portion 206 which is configured for insertion into and/or adjacent the multifiber ferrule 112 (FIG. 1) depending on the configuration. The connector insertion portion 206 may define a connector width 208a, which may be less than the handle width 204a and a connector height 208b, which may be less than the handle height 204b. Accordingly, the overmolded ferrule boot 110 may define a connector backstop 210 at the areas where the handle portion 202 meets the connector insertion portion 206. Additionally, in some embodiments, the connector insertion portion 206 may be tapered at the lead-in end for creating a tapered portion 212 to provide easier insertion and/or positive fit of a portion of the overmolded ferrule boot 110 within the multifiber ferrule 112. Additionally, in some embodiments, the tapered portion 212 connects with the ferrule 112 to prevent flowable material from escaping from the ferrule boot 110 during the overmolding process.

Figure 3A:
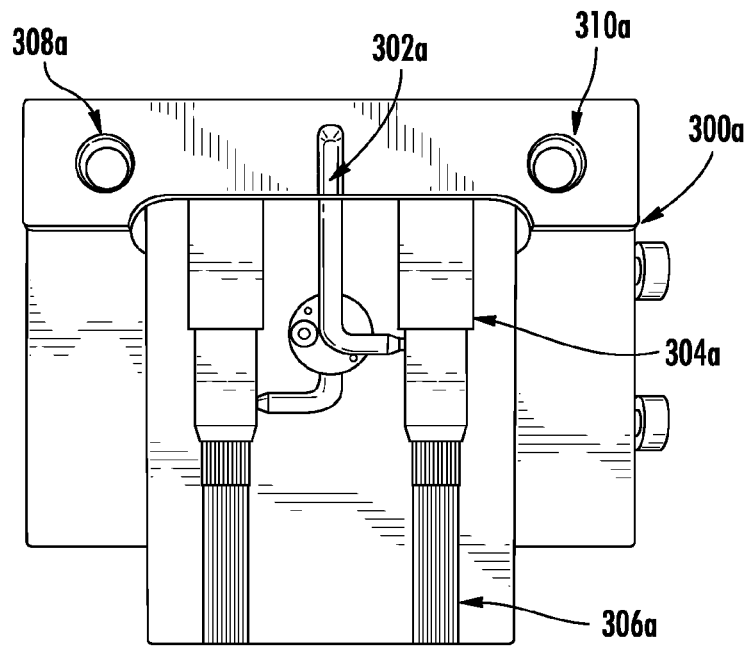
FIGS. 3A-3D depict an explanatory alignment fixture for creating an overmolded ferrule boot assembly, according to embodiments disclosed herein.

FIGS. 3A-3D depict an explanatory overmolded ferrule boot assembly that includes an alignment fixture 300a, 300b for creating an overmolded ferrule boot, according to embodiments disclosed herein. As illustrated in FIG. 3A, a base portion alignment fixture 300a may include a base die portion 304a for creating the overmolded ferrule boot 110. The base portion alignment fixture 300a may also include a base flowable material port 302a, which feeds flowable material to the base die portion 304a. The base die portion 304a may include a plurality (in some embodiments between 2 and 12, however any number may be utilized for connecting to the multifiber ferrule) of base recesses for receiving the plurality of optical fibers. Additionally included is a base fiber receiving portion 306a for receiving the optical fibers (in cable form and/or as individual optical fibers) around which the overmolded ferrule boot 110 will be formed. Also included are female connection portions 308a, 310a for receiving respective male connection portions 308b, 310b from the cover portion alignment fixture 300b.

It should be understood that while the description of FIG. 3A only deals with one side of the base portion alignment fixture 300a, the other (left side in the depiction of FIG. 3A) may also be used for creating an overmolded ferrule boot. Similarly, some embodiments may have more or fewer die portions 304a, on each portion of the alignment fixture 300a, 300b.

Depending on the particular embodiment, any shape of ferrule boot may be created as desired. As an example, in addition to the shape depicted in FIG. 3A, other shapes may include an approximately cubic ferrule boot, an approximately rectangular ferrule boot, an approximately oval ferrule boot, and an approximately spherical ferrule boot. Moreover, the overmolded boot can extend further rearward as desired and may cover a portion of other cable components such as strength members, a tube, and/or the cable jacket as desired. Additionally, embodiments where the overmolded boot extends further rearward the boot may provide strain relief and may interface with other components of other connector design such as being sandwiched between portions of a housing or the like.

Figure 3B:
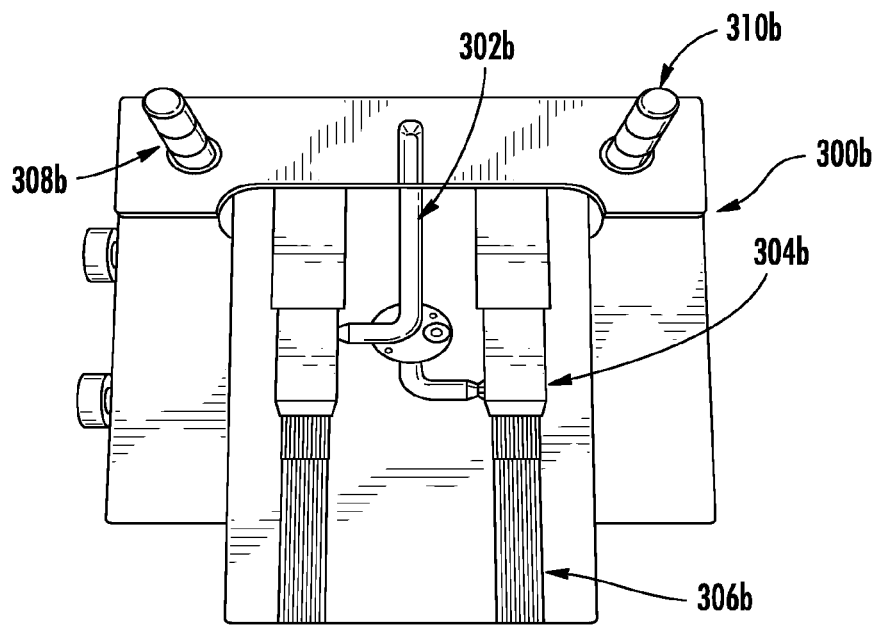

As illustrated in FIG. 3B, a cover portion alignment fixture 300b may be configured to be placed facing the base portion alignment fixture 300a, such that male connection portions 308b, 310b match up and connect with the female connection portions 308a, 310a. By aligning the alignment fixture portions 300a, 300b in such a manner, a cover die portion 304b may align with the base die portion 304a, a cover flowable material port 302b may align with the base flowable material port 302a, and a cover fiber receiving portion 306b may align with the base fiber receiving portion 306a. With these alignments, an interior cavity is defined for creating the overmolded ferrule boot 110.

Figure 3C:
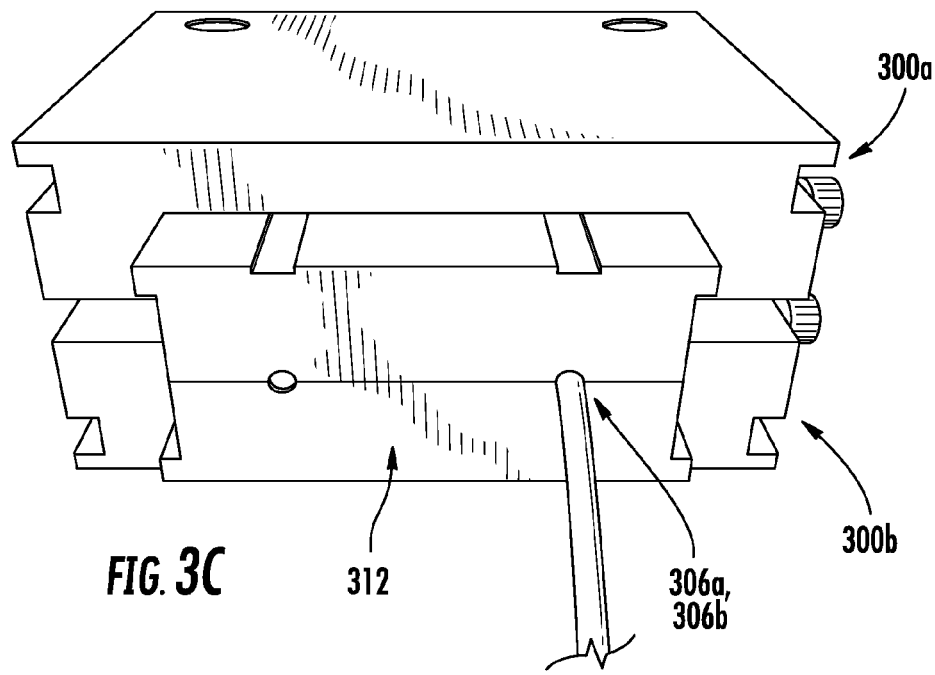
Figure 3D:
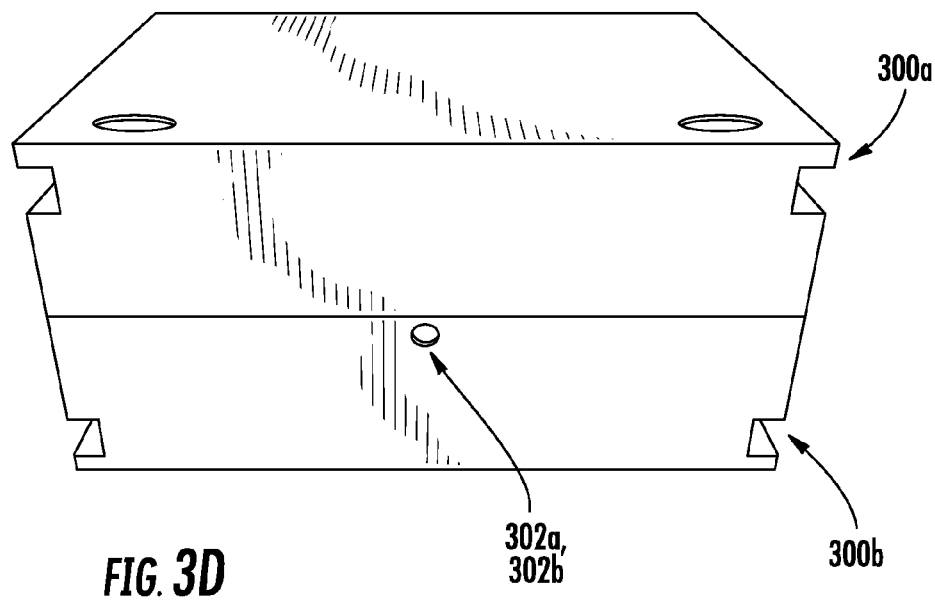

Similarly, FIG. 3C illustrates the alignment fixture 300 as constructed of the base portion 300a and the cover portion 300b. Also included are the fiber receiving portions 306a, 306b aligned together to receive the optical fibers as an optical cable and/or as individual fibers, as well as a heating portion 312. The heating portion 312 may be configured to maintain the current temperature and/or raise the current temperature of a flowable material inserted into the alignment fixture 300. In some embodiments, the heating portion 312 may be configured as a heat shrinking portion for shrinking a heat shrinking alignment portion, as illustrated in FIG. 5. Similarly, FIG. 3D illustrates another portion of the alignment fixture 300, which includes the base flowable material port 302a and the cover flowable material port 302b, which thereby define an alignment fixture channel for receiving the flowable material that cures (after waiting a predetermined time) to create the overmolded ferrule boot 110. As illustrated the base portion 300a and the cover portion 300b are configured to seal together to prevent leakage of the flowable material.

In some embodiments, when the fibers are inserted into the alignment fixture 300, the fibers may be placed such that a predetermined length of the fibers extend beyond an end of the alignment fixture 300. This allows for the fibers to be easily inserted into the bores or passageway of the multifiber ferrule so the optical fibers may extend flush or beyond the mating face of the ferrule.

While the embodiment of FIGS. 3A-3D illustrate an alignment fixture 300 for creating an overmolded ferrule boot with a single linear configuration of fibers, this is merely an example. In some embodiments, the base portion of the alignment fixture 300a may include the base die portion 304a on one side and another die portion (not explicitly shown) on the opposing side of the base portion of the alignment fixture 300a. Thus, the base portion of the alignment fixture 300a may be configured for receiving the cover portion of the alignment fixture 300b, on one side, as well as an over cover portion of the alignment fixture on the other side. The over cover portion of the alignment fixture may include opposing recesses, similar to the recesses on the base portion of the alignment fixture 300b. Such a configuration may allow for the creation of a ferrule boot with two rows of optical fibers.

FIG. 4 depicts an exploded view of a fiber optic connector 400 with a heat shrink alignment portion 410, according to embodiments disclosed herein. More specifically, the fiber optic connector 400 is substantially similar to the fiber optic connector 100 (FIG. 1), with the exception that the ferrule boot includes the heat shrink alignment portion 410. In this embodiment, the ferrule boot 410 is preformed before being reheated and reformed about the optical fibers for integrally forming the same with the fibers. As such, the alignment fixture 300 from FIGS. 3A-3D may be modified to receive a solid piece that shrinks upon the application of heat. When this occurs, the inserted fibers may be secured in proper alignment. Upon proper alignment of the optical fibers, the optical fibers may be coupled with a multifiber ferrule 412, similar to the multifiber ferrule 112 from FIG. 1. Optionally, a flowable material may be used with the heat shrink alignment portion 410 if desired.

The heat shrink alignment portion 410 may be constructed of any of a plurality of different heat shrinking materials. Examples include but are not limited to polymers, polyolefin, and poly vinyl chloride (PVC). However, depending on the particular embodiment other heat shrinking materials may be utilized.

FIG. 5 depicts a detailed explanatory embodiment of the heat shrink alignment portion 410, according to embodiments disclosed herein. As illustrated, the heat shrink alignment portion may be constructed of a heat shrinking material and may include a body portion 502 that defines plurality of recesses 504 for receiving individual optical fibers. The plurality of recesses 504 may be aligned for proper insertion into the multifiber ferrule 412. As discussed above, upon inserting the optical fibers into one or more of the plurality of recesses 504, heat may be applied to the heat shrink alignment portion 410, thereby closing the recesses to secure each of the optical fibers in a desired alignment for insertion into the multifiber ferrule 412. In this embodiment, heat shrink alignment portion 410 has two rows of recesses 504, but embodiments may have a single row or more than two rows as desired.

Figure 6:
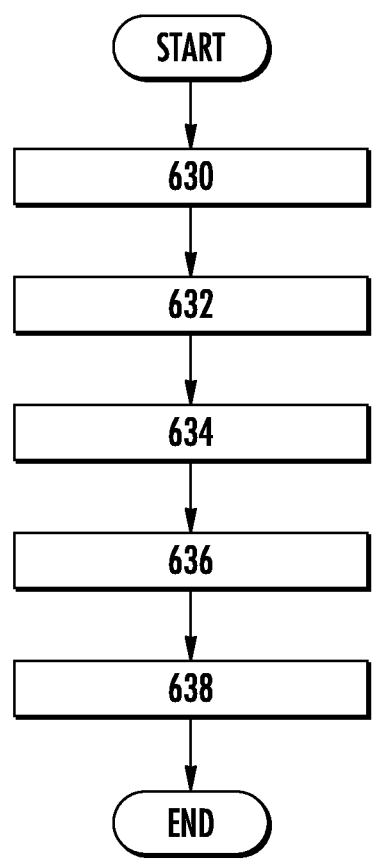
FIG. 6 depicts an embodiment of a flowchart for creating an overmolded ferrule boot, according to embodiments disclosed herein.

FIG. 6 depicts an embodiment of a flowchart for creating an overmolded ferrule boot, according to the concepts disclosed herein. As illustrated in block 630, a first plurality of optical fibers may be positioned in corresponding base recesses of a base portion of an alignment fixture. The first plurality of fibers may be positioned in a predetermined arrangement, such that a predetermined length of the first plurality of fibers extends beyond an end of the base portion to leave a suitable length for insertion into the ferrule. At block 632, a cover portion of the alignment fixture may be positioned onto the first plurality of fibers, such that corresponding cover recesses on the cover portion align with the corresponding base recesses on the base portion. At block 634, a flowable material may be injected into a port on the alignment fixture. At block 636, a predetermined time may be waited for the flowable material to cure. At block 638, after the predetermined time, the base portion and the cover portion may be separated from the first plurality of fibers and the flowable material to create the overmolded ferrule boot.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for creating an overmolded ferrule boot for connecting to a ferrule, comprising:
   positioning a first plurality of fibers in corresponding base recesses of a base portion of an alignment fixture, the first plurality of fibers positioned in a predetermined arrangement, the first plurality of fibers positioned such that a predetermined length of the first plurality of fibers extends beyond an end of the base portion;
   positioning a cover portion of the alignment fixture onto the frrst plurality of fibers, such that corresponding cover recesses on the cover portion align with the corresponding base recesses on the base portion;
   injecting a flowable material into a port on the alignment fixture;
   applying heat to the flowable material, wherein the flowable material is a heat shrinking material;
   waiting a predetermined time for the flowable material to cure; and
   after the predetermined time, separating the base portion and the cover portion from the first plurality of fibers and the flowable material to create the overmolded ferrule boot.

2. The method of claim 1, further comprising:
   positioning a second plurality of fibers in corresponding opposing recesses on an opposite side of the base portion from the corresponding base recesses; and
   positioning an over covering portion onto the second plurality of fibers, such that corresponding over covering recesses on the over covering portion align with the opposing recesses on the base portion.

3. The method of claim 1, further comprising connecting the overmolded ferrule boot to a ferrule.

4. The method of claim 1, wherein the first plurality of fibers comprises between 2 fibers and 24 fibers.

5. The method of claim 1, wherein the base portion and the cover portion connect to create a seal that prevents leakage of the flowable material.

6. The method of claim 1, wherein an interior cavity that is created by positioning of the base portion together with the cover portion defines at least one of the following shapes: approximately cubic, approximately rectangular, approximately oval, and approximately spherical.

7. An overmolded ferrule boot assembly, comprising:
   a first plurality of fibers arranged in a first linear configuration;
   a ferrule assembly that comprises a ferrule and an overmolded ferrule boot that is integral with the first plurality of fibers, wherein the overmolded ferrule boot comprises a connector insertion portion and a handle portion, the connector insertion portion defining a connector width, the handle portion defining a handle width, wherein the handle width is greater than the connector width, such that the handle portion extends beyond the connector insertion portion to define a connector backstop; and
   a heat shrink alignment portion that includes a plurality of recesses for receiving the first plurality of fibers.

8. The overmolded ferrule boot assembly of claim 7, further comprising a second plurality of fibers arranged in a second linear configuration that is substantially parallel with the first linear configuration, the second plurality of fibers residing within and being integral with the overmolded ferrule boot.

9. The overmolded ferrule boot assembly of claim 7, wherein the first plurality of fibers comprises between 2 fibers and 24 fibers.

10. The overmolded ferrule boot assembly of claim 7, wherein the overmolded ferrule boot comprises at least one of the following shapes: approximately cubic, approximately rectangular, approximately oval, and approximately spherical.

11. The overmolded ferrule boot assembly of claim 7, wherein the connector width decreases toward an end of the connector insertion portion that is opposite the connector backstop.

12. A method for creating an overmolded ferrule boot for a ferrule, comprising:
   positioning a plurality of fibers in corresponding recesses of an alignment fixture, the plurality of fibers positioned in a predetermined arrangement, the plurality of fibers positioned such that a predetermined length of the plurality of fibers extends beyond an end of the alignment fixture;
   providing a heat shrink alignment portion to the alignment fixture;
   waiting a predetermined time for the alignment fixture to cure; and
   after the predetermined time, removing the heat shrink alignment portion from the plurality of fibers to create the overmolded ferrule boot.

13. The method of claim 12, wherein the alignment fixture includes a base portion, a cover portion, and a heating portion, wherein the plurality of fibers are inserted into the recesses of the heating portion, and wherein the base portion and the cover portion fit together around the heating portion and the plurality of fibers.

14. The method of claim 13, further comprising connecting the base portion with the cover portion around the heat shrinking portion.

15. The method of claim 12, wherein the plurality of fibers comprises between about 2 fibers and about 12 fibers.

16. The method of claim 12, further comprising connecting the overmolded ferrule boot to a ferrule.

17. The assembly made according to the method of claim 12.

* * * * *